(12) United States Patent
Unnerstall et al.

(10) Patent No.: US 12,115,620 B2
(45) Date of Patent: Oct. 15, 2024

(54) POLISHING DEVICE

(71) Applicant: RUD. STARCKE GMBH & CO. KG, Melle (DE)

(72) Inventors: Werner Unnerstall, Melle (DE); Christian Wall, Hiddenhausen (DE); Christian Burstein, Werther (DE); Stephan Kampmeyer, Melle (DE); Diethard Sinram, Spenge (DE); Peter Alfer, Melle (DE)

(73) Assignee: Rud. Starcke GmbH & Co. KG, Melle (DE)

( * ) Notice: Subject to any disclaimer, the term of this patent is extended or adjusted under 35 U.S.C. 154(b) by 647 days.

(21) Appl. No.: 17/273,531

(22) PCT Filed: Aug. 30, 2019

(86) PCT No.: PCT/EP2019/073162
§ 371 (c)(1),
(2) Date: Mar. 4, 2021

(87) PCT Pub. No.: WO2020/048874
PCT Pub. Date: Mar. 12, 2020

(65) Prior Publication Data
US 2021/0187698 A1    Jun. 24, 2021

(30) Foreign Application Priority Data

Sep. 5, 2018   (DE) .................. 10 2018 121 626.2

(51) Int. Cl.
*B24B 57/02*  (2006.01)
*B24B 29/00*  (2006.01)
*B24B 41/04*  (2006.01)

(52) U.S. Cl.
CPC .............. *B24B 57/02* (2013.01); *B24B 29/00* (2013.01); *B24B 41/04* (2013.01)

(58) Field of Classification Search
CPC .......... B24B 57/02; B24B 29/00; B24B 41/04
(Continued)

(56) References Cited

U.S. PATENT DOCUMENTS 1,952,910 A   3/1934   Decker
5,203,508 A   4/1993   Westenberger
(Continued)

FOREIGN PATENT DOCUMENTS

CN   201516576     *  6/2010   ............. B24B 29/00
CN   201516576 U     6/2010
(Continued)

OTHER PUBLICATIONS

Citation of German Office Action dated Jul. 19, 2019 in related/corresponding DE Application No. 10 2018 121 626.2.
(Continued)

*Primary Examiner* — Abbie E Quann
(74) *Attorney, Agent, or Firm* — PATENT PORTFOLIO BUILDERS PLLC

(57) ABSTRACT

A polishing device is held on a robot arm and has a support plate, a polishing disc held on the support plate, a drive moving the support plate in a plane, and a metering device for feeding a polishing agent to the working side of the polishing disc. An application nozzle of the metering device is guided through an open central axis of the support plate, the polishing disc having a central opening for allowing the passage of the polishing agent metered in computer-controlled manner.

13 Claims, 3 Drawing Sheets

(58) Field of Classification Search
USPC .................................. 451/280, 56, 287, 288
See application file for complete search history.

(56) References Cited

U.S. PATENT DOCUMENTS

| | | | |
|---|---|---|---|
| 6,514,129 B1* | 2/2003 | Halley ................ | B24B 57/02 451/291 |
| 8,713,806 B2 | 5/2014 | Tokunaga et al. | |
| 9,522,453 B2* | 12/2016 | Aizawa ............... | B24B 37/015 |
| 2011/0217911 A1* | 9/2011 | Chang ................ | B24B 41/06 451/526 |
| 2012/0220206 A1* | 8/2012 | Borucki ............. | B24B 57/02 451/446 |
| 2015/0367478 A1* | 12/2015 | Lefevre .............. | B24B 37/205 451/526 |
| 2016/0059376 A1* | 3/2016 | Yamaguchi ........ | B24B 37/345 156/345.12 |
| 2016/0128461 A1 | 5/2016 | Akashi et al. | |
| 2020/0324393 A1 | 10/2020 | Unnerstall et al. | |

FOREIGN PATENT DOCUMENTS

| | | | | |
|---|---|---|---|---|
| DE | 4222766 | A1 | 1/1994 | |
| DE | 19736291 | A1 | 2/1999 | |
| DE | 102017130805 | A1 | 6/2019 | |
| JP | H03234460 | A | 10/1991 | |
| JP | H0752033 | A | 2/1995 | |
| JP | 3131682 | * | 2/2001 | ............ B24B 57/02 |
| JP | 3131682 | B2 | 2/2001 | |
| KR | 101403089 | B1 | 6/2014 | |
| RU | 2113965 | C1 | 6/1998 | |
| SU | 204169 | A2 | 10/1967 | |
| SU | 1033297 | A | 8/1983 | |
| WO | 0037215 | A1 | 6/2000 | |
| WO | 2009151059 | A1 | 12/2009 | |

OTHER PUBLICATIONS

International Search Report mailed Nov. 18, 2019 in related/corresponding International Application No. PCT/EP2019/073162.
Written Opinion mailed Nov. 18, 2019 in related/corresponding International Application No. PCT/EP2019/073162.
Office Action dated Jan. 17, 2023 in related/corresponding RU Application No. 2021104275/05.
Search Report dated Dec. 30, 2022 in related/corresponding RU Application No. 2021104275/05.
Office Action dated May 16, 2024 in related/corresponding EP Application No. 19 762 352.3.

* cited by examiner

POLISHING DEVICE

BACKGROUND AND SUMMARY OF THE INVENTION

Exemplary embodiments of the invention relate to a polishing device.

For finishing surfaces, in particular painted surfaces, use is made of polishing discs which are made of a very soft material, for example of a foam, foamed rubber, felt or sheepskin. The respective polishing disc is held on a support plate of the polishing device, which in turn is movable, usually in rotation, by way of a drive.

A highly viscous polishing paste is applied to the working side of the polishing disc located opposite the support plate, the amount of polishing agent applied being of critical importance for an optimal polishing result.

When using a new polishing disc, initially a relatively large amount of polishing agent is applied and is worked into the polishing disc. Then, in further, subsequent polishing operations, only a small amount of polishing agent is applied for the respective polishing process, wherein preferably flat workpieces are polished by orbital, rotational and vibrating movements of the polishing tool.

To avoid spatters of polish, a precise positioning of the polishing disc and/or of the polishing paste and also the pattern thereof on the polishing disc is important. The polishing result is determined by the pressing force with which the polishing disc is pressed against the workpiece, the rotational speed, and the polishing time.

DE 10 2017 130 805, which was not previously published, proposes a metering device by which the polishing agent is applied to the working face of the polishing disc, for which purpose the metering device has an application nozzle. In the document, the support plate together with the polishing disc moves relative to the metering device, which in this respect is arranged in a stationary manner.

This construction has proven to be successful in principle. However, calls are being made to shorten the cycle time losses during the polishing process, since the movement of the polishing disc towards the metering device and the application of the polishing paste are relatively time-consuming.

U.S. Pat. No. 1,952,910 A, WO 00/037215 A1 and DE 42 22 766 A1 each disclose a polishing device, but these are manually guided, in contrast to the generic type, and therefore they are not suitable for industrial use, which requires automated machining of surfaces.

Exemplary embodiments of the invention are directed to further developing a polishing device of the generic type in such a way that the usability thereof is improved with little effort in terms of construction.

By virtue of this construction, the machining time for a workpiece is considerably reduced since it is no longer necessary to move the support plate together with the connected polishing disc to a metering device.

Instead, the polishing agent is now supplied directly to the polishing disc, i.e., possibly even during the polishing process.

In terms of construction, this is achieved in that an application nozzle of the metering device is routed through an open central shaft of the support plate, wherein the polishing disc has a central opening for the passage of the polishing agent.

Preferably, the application nozzle is held in a rotary feedthrough, which may be designed as a freewheel, so that the application nozzle remains in place while the freewheel rotates with respect to the support plate and thus the polishing disc.

With regard to a drive that determines the polishing path, for example an eccentric movement, the application nozzle is connected thereto, as is the support plate. In other words, the application nozzle executes the same path movement as the support plate and/or the polishing disc.

In accordance with the generic type, the polishing device is held on a robot arm which, in a computer-controlled manner, moves the polishing device to where a flaw on the workpiece surface is detected for example by means of a sensor system. The discharged amount of polishing agent, in particular a polishing paste, is likewise computer-controlled according to the invention.

The amount of polishing agent supplied or to be supplied for the polishing process is preferably between 0.2-5 g. When using a new polishing disc, however, a larger amount of polishing agent is supplied on a one-off basis, namely between 1 and 10 g, wherein the volume capacity of the supply line is preferably a multiple of the maximum amount of polishing agent to be metered. The polishing agent is not supplied to the polishing disc until the latter is positioned at a distance of 3 mm from the surface to be polished.

The metering device is preferably provided with a reservoir, which is connected to the application nozzle via a supply line, wherein the supply line is designed in a shape-stable manner as a pipe or in a flexible manner as a suitable hose.

A changeover device may also be provided within the access range of the robot arm, by means of which changeover device a polishing disc can be changed in a quasi-automated manner when the maximum service life of the polishing disc has been reached. The polishing disc itself, which is held on the support plate, is preferably made of a soft material, in particular a foam or the like, and usually has a thickness of 10 to 20 mm.

The changeover device, which like the polishing device according to the invention contributes to an optimized workflow, is discussed in the aforementioned document DE 10 2017 130 805, which was not previously published.

To minimize any disruptive input of heat into the surface as a result of the polishing, according to another concept it is provided to cool the surface by means of compressed air, which moreover is routed onto the surface to be polished via the supply line for the polishing agent.

To minimize the input of heat, it may also be provided that the electric drive of the polishing device takes place via a toothed belt connected to an electric motor, the toothed belt being decoupled from the polishing device.

After the computer-controlled metering according to the invention, the polishing agent is transported to the application nozzle by compressed air, wherein the polishing disc, usually a polishing sponge, rotates at reduced speed so that the polishing agent is distributed onto the surface to be polished.

According to another concept of the invention, channels may be incorporated in the working face of the polishing disc, as a result of which the polishing agent is evenly distributed. Preferably, the channels extend in a star shape from the application nozzle or the central opening of the polishing disc to the outer edge thereof.

The channels may vary in width and length depending on requirements, wherein, according to one advantageous development of the invention, the depth of the channels decreases towards the outer edge of the polishing disc.

After approximately half of the polishing time, the compressed air is supplied to the polishing disc as cooling air through the supply line in order, as mentioned, to minimize any input of heat.

To this end, according to another concept of the invention, also the support plate is provided with a plurality of apertures, via which heat generated during the polishing can be dissipated.

Overall, the design according to the invention, including the advantageous developments, considerably reduces the amount of polishing agent and also the spattering of polishing agent.

Furthermore, cleaning of the polished surface is much easier and can now be carried out automatically by a downstream wiping device, wherein also the actuation thereof takes place in a computer-controlled manner.

In addition, it has been found that the polishing time is minimized and the polishing result is considerably improved. The service life of the polishing disc is also markedly increased, which has a positive effect on the cleaning effort and also the disposal of the polishing disc.

Exemplary embodiments of the invention will be described below with reference to the accompanying drawings.

BRIEF DESCRIPTION OF THE DRAWING FIGURES

DETAILED DESCRIPTION

Figure 1:
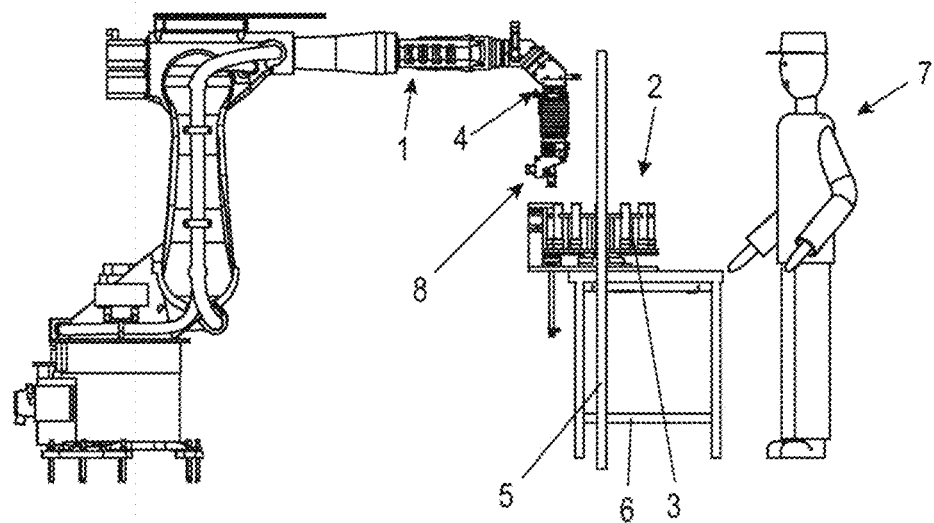
FIG. 1 shows the use of a polishing device according to the prior art.

FIG. 1 shows the use of a polishing device 4 according to the prior art, wherein said polishing device is held on a robot arm 1.

A changeover device 2, positioned on a work table 6 and comprising a plurality of dispensers 3 held on a turntable, is movable in cycles such that in each case one polishing disc 10 (FIG. 2) can be connected to a support plate 9.

A set-up area is separated from a working area by a partition 5, wherein the robot arm 1 with part of the changeover device 2 is arranged in the working area, while the set-up area is intended for an operator 7 to equip the changeover device 2 with dispensers 3. The support plate 9 and respectively the polishing disc 10 is assigned a metering device 8, by means of which a polishing agent can be applied to the working face of the polishing disc 10.

Figure 2:
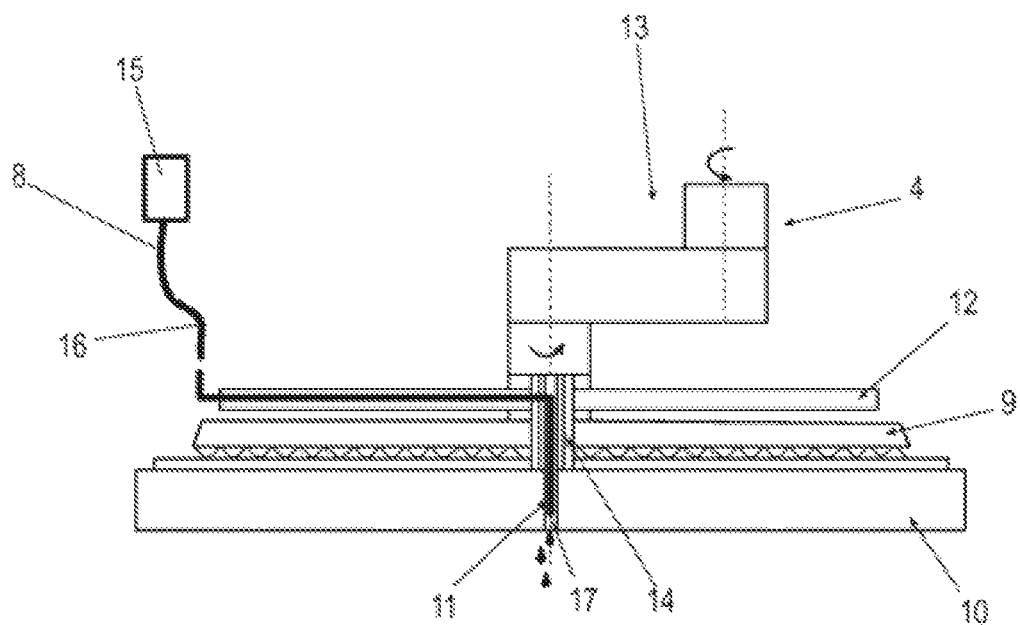
FIG. 2 shows the polishing device according to the invention in a schematic side view.

The arrangement of the metering device 8 is illustrated in FIG. 2.

In the example, the support plate 9 is fastened to a rotating shaft 14 in such a way as to rotate therewith, the rotating shaft being part of an eccentric drive 13, by means of which an eccentric polishing path is described, the path also being followed by the polishing disc 10 held on the support plate 9.

The metering device 8 has a supply line 16 that opens into an application nozzle 11, wherein the application nozzle 11, according to the invention, is routed through the open rotating shaft 14, which forms a central shaft, to a central opening 17 of the polishing disc 10, from which a polishing agent, in particular a polishing paste, exits towards the working face of the polishing disc 10 in a metered manner controlled by a computer.

The supply line 16 and the application nozzle 11 are held in a freewheel 12. While the rotating shaft 14 and thus the support plate 9 and the polishing disc 10 rotate, the application nozzle 11 and the supply line 16 remain in their position. In other words, the support plate 9 performs a movement relative to the application nozzle 11 and to the supply line 16.

Also connected thereto is a reservoir 15, which holds the polishing agent that is supplied to the application nozzle 11 via the supply line 16 in a metered manner controlled by a computer.

Since the metering device 8 is fixedly positioned with respect to the eccentric drive 13, the metering device 8 performs the eccentric movements in the same way as the support plate 9 and the polishing disc 10.

The eccentric drive 13 is to be regarded merely as an exemplary embodiment. Other drives which describe the polishing path are also conceivable, for example in order to generate an orbital movement.

Figure 3:
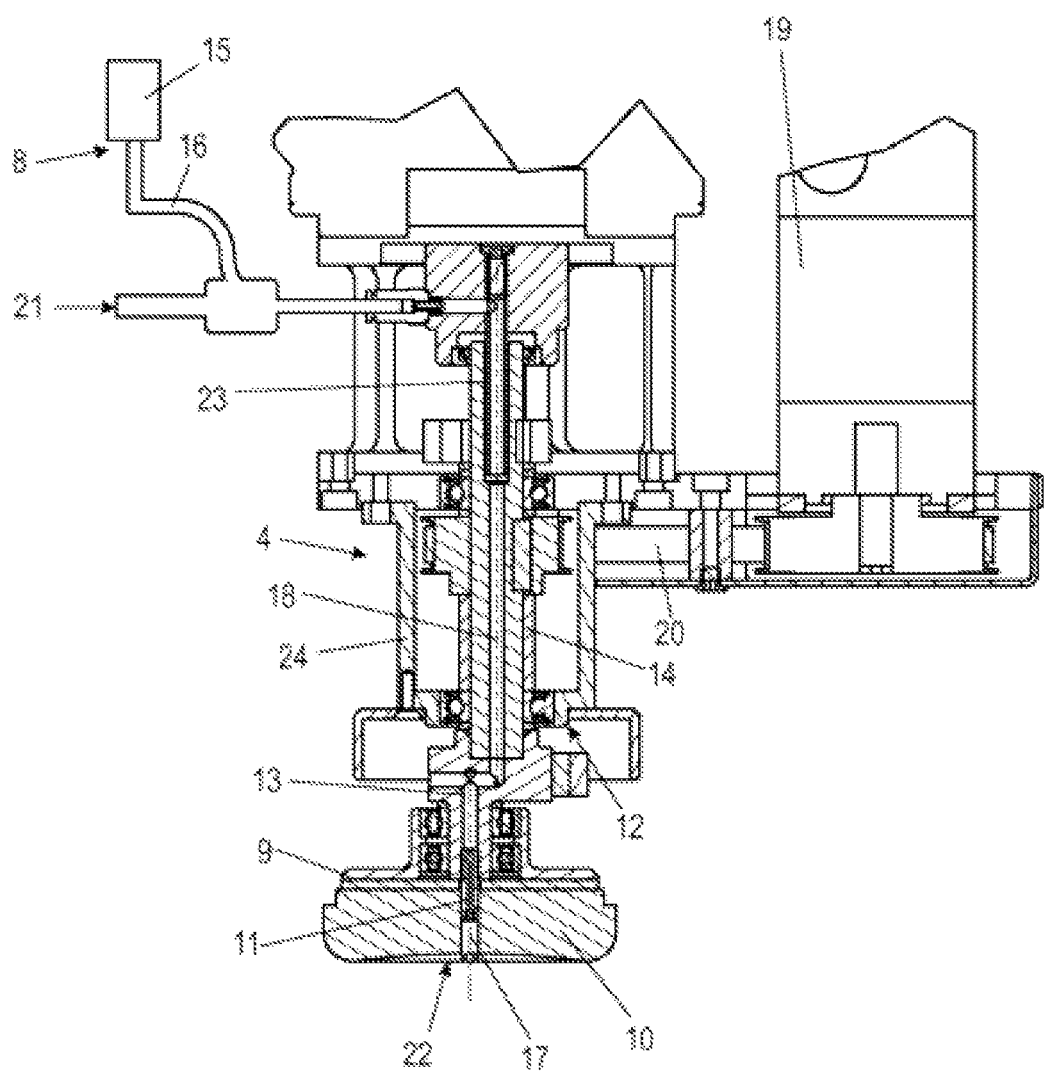
FIG. 3 shows another exemplary embodiment of the polishing device according to the invention in a sectional side view.

FIG. 3 shows another exemplary embodiment of a polishing device according to the invention, wherein the same reference signs as in FIG. 2 are used for the same functional parts.

The eccentric drive 13 is driven by way of an electric motor 19, wherein the electric motor 19, via a toothed belt 20, drives the rotating shaft 14 and thus the eccentric drive 13 and the polishing disc 10. Here, the rotating shaft 14 is mounted in a housing 24, which is connected to the robot arm 1.

Connected to the supply line 16 is a compressed air line 21, via which there is routed both compressed air for transporting the polishing agent and also the compressed air for cooling the polishing disc 10 and/or the surface to be polished. The supply line 16 opens into an injection pipe 23, which leads into a channel 18, via which the polishing agent and the compressed air are supplied to the application nozzle 11, which is positioned in the central opening 17 of the polishing disc 10.

The central opening 17 merges into channels 22 on the working side of the polishing disc 10, wherein said channels 22 serve to distribute the polishing agent on the surface to be polished.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A polishing device held on a robot arm, the polishing device comprising: a support plate; a polishing disc held on the support plate; a drive that moves the support plate in a plane; and a metering device for supplying a polishing agent to a working side of the polishing disc, wherein the metering device includes an application nozzle that is routed through an open central shaft of the support plate, wherein the polishing disc has a central opening for passage of the polishing agent, and wherein the polishing agent is metered in a computer-controlled manner, wherein the open central shaft is a rotating shaft, wherein a supply line of the metering device is routed through a rotary feedthrough of the rotating shaft or through a freewheel, and wherein an injection pipe, in which the polishing agent and compressed air can be routed, is arranged between the supply line and a channel routed through the rotating shaft.

2. The polishing device of claim 1, wherein the metering device is positioned fixedly with respect to the drive.

3. The polishing device of claim 1, wherein the rotating shaft is rotatable with respect to the application nozzle or the supply line, wherein the support plate is connected to the rotating shaft in such a way as to rotate with the rotating shaft.

4. The polishing device of claim 1, wherein the supply line consists of a pipe or a flexible hose.

5. The polishing device of claim 1, wherein the metering device has a reservoir for holding the polishing agent, wherein the reservoir is connected to the supply line.

6. The polishing device of claim 1, further comprising:
an electric motor which, by means of a toothed belt, drives the polishing disc via the rotating shaft and an eccentric drive.

7. The polishing device of claim 1, wherein a compressed air line is connected to the supply line.

8. The polishing device of claim 1, wherein a volume capacity of the supply line and of the channel is greater than the metered amount of the polishing agent.

9. The polishing device of claim 1, wherein a rotational speed of the polishing disc is variable.

10. The polishing device of claim 1, wherein the working side of the polishing disc has channels connected to the central opening.

11. The polishing device of claim 10, wherein the channels of the polishing disc extend outwards in a star shape starting from the central opening.

12. The polishing device of claim 10, wherein a depth of the channels of the polishing disc decreases towards an outer edge of the polishing disc.

13. The polishing device of claim 1, wherein the support plate has apertures.

* * * * *